(12) United States Patent
Sung et al.

(10) Patent No.: US 10,841,470 B2
(45) Date of Patent: Nov. 17, 2020

(54) CAMERA MODULE AND MANUFACTURING METHOD THEREOF

(71) Applicant: LG INNOTEK CO., LTD., Seoul (KR)

(72) Inventors: Jae Hun Sung, Seoul (KR); Min Woo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 33 days.

(21) Appl. No.: 16/076,952

(22) PCT Filed: Jan. 10, 2017

(86) PCT No.: PCT/KR2017/000313
§ 371 (c)(1),
(2) Date: Aug. 9, 2018

(87) PCT Pub. No.: WO2017/138698
PCT Pub. Date: Aug. 17, 2017

(65) Prior Publication Data
US 2019/0052782 A1   Feb. 14, 2019

(30) Foreign Application Priority Data

Feb. 11, 2016 (KR) .................. 10-2016-0015880

(51) Int. Cl.
*H04N 5/225* (2006.01)
*B23K 26/22* (2006.01)
(Continued)

(52) U.S. Cl.
CPC .......... *H04N 5/2254* (2013.01); *B23K 26/22* (2013.01); *B23K 26/32* (2013.01); *G03B 17/08* (2013.01);
(Continued)

(58) Field of Classification Search
CPC .... H04N 5/2254; H04N 5/2252; G03B 17/12; G03B 17/08; B23K 26/32; B23K 26/22; B23K 2101/20; B23K 2101/04
See application file for complete search history.

(56) References Cited

U.S. PATENT DOCUMENTS

| 6,507,700 B1 * | 1/2003 | Takekuma ........... H04N 5/2252 348/81 |
| 2005/0116138 A1 * | 6/2005 | Hanada ................ H04N 5/2254 250/206 |

(Continued)

FOREIGN PATENT DOCUMENTS

| JP | 09-113756 A | 5/1997 |
| JP | 2010-050771 A | 3/2010 |

(Continued)

OTHER PUBLICATIONS

International Search Report in International Application No. PCT/KR2017/000313, filed Jan. 10, 2017.

*Primary Examiner* — Jason A Flohre
(74) *Attorney, Agent, or Firm* — Saliwanchik, Lloyd & Eisenschenk

(57) ABSTRACT

A camera module comprising: a lens barrel comprising a lens; a lens holder for accommodating the lens barrel; an image sensor disposed below the lens barrel; a printed circuit board on which the image sensor is mounted and is coupled to the lens barrel; and at least one welding point for mutually coupling the lens barrel and the lens holder while an optical axis of the lens and an optical axis of the image sensor are aligned.

18 Claims, 9 Drawing Sheets

(51) Int. Cl.
*G03B 17/12* (2006.01)
*B23K 26/32* (2014.01)
*G03B 17/08* (2006.01)
*B23K 101/20* (2006.01)
*B23K 101/04* (2006.01)

(52) U.S. Cl.
CPC ........... *G03B 17/12* (2013.01); *H04N 5/2252* (2013.01); *B23K 2101/04* (2018.08); *B23K 2101/20* (2018.08)

(56) References Cited

U.S. PATENT DOCUMENTS

| | | | | |
|---|---|---|---|---|
| 2005/0117048 | A1* | 6/2005 | Matsushita | H04N 5/2254 348/340 |
| 2006/0077575 | A1* | 4/2006 | Nakai | H04N 5/2257 359/819 |
| 2009/0103193 | A1* | 4/2009 | Berube | G02B 7/02 359/819 |
| 2015/0124098 | A1* | 5/2015 | Winden | H04N 5/2253 348/148 |
| 2016/0100082 | A1* | 4/2016 | Schack | H04N 5/2252 348/373 |

FOREIGN PATENT DOCUMENTS

| | | | |
|---|---|---|---|
| JP | 2010-139627 A | 6/2010 | |
| JP | 2010-281962 A | 12/2010 | |
| JP | 2015-040890 A | 3/2015 | |

\* cited by examiner

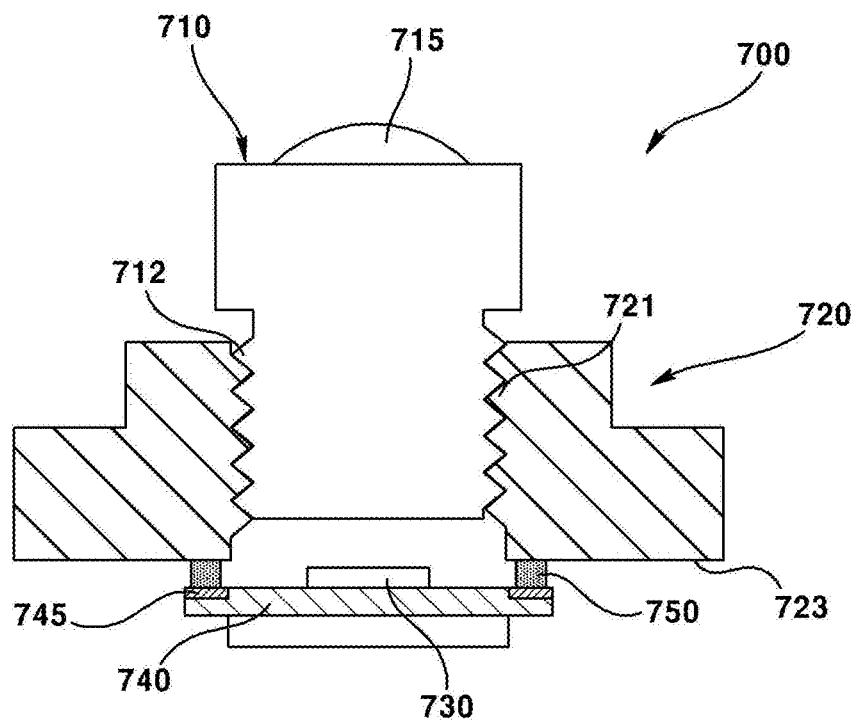

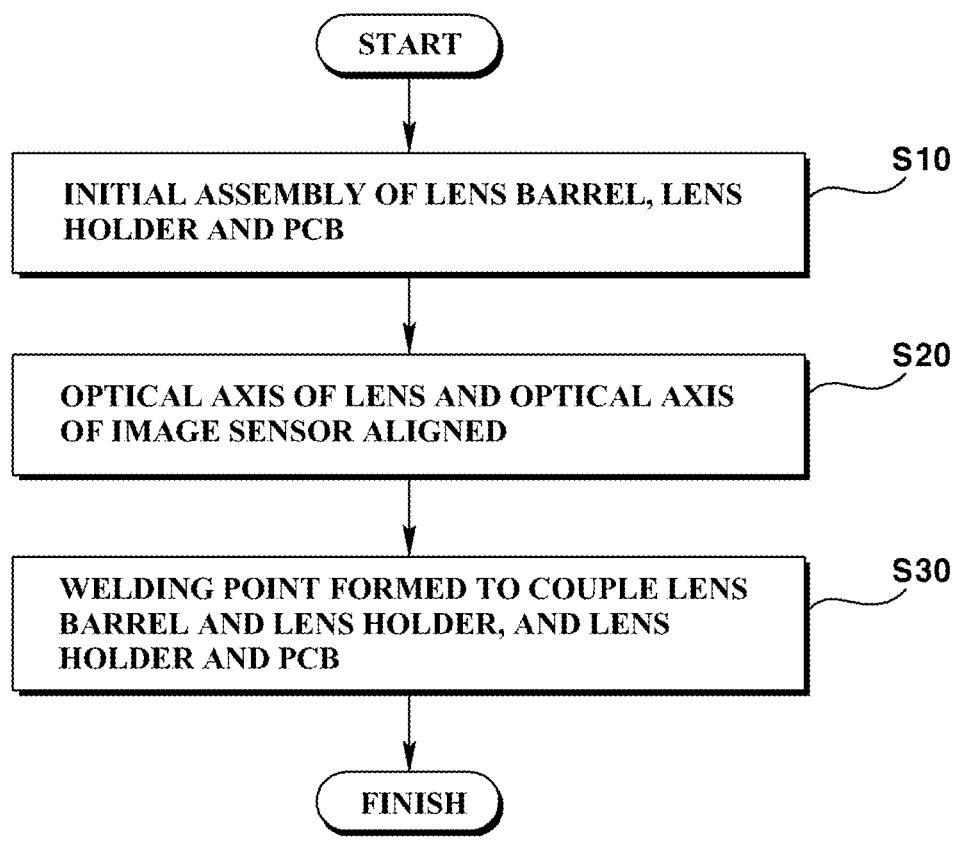

CAMERA MODULE AND MANUFACTURING METHOD THEREOF

CROSS-REFERENCE TO RELATED APPLICATIONS

This application is the U.S. national stage application of International Patent Application No. PCT/KR2017/000313, filed Jan. 10, 2017, which claims the benefit under 35 U.S.C. § 119 of Korean Application No. 10-2016-0015880, filed Feb. 11, 2016, the disclosures of each of which are incorporated herein by reference in their entirety.

TECHNICAL FIELD

The teachings in accordance with exemplary and non-limiting embodiments of this invention relate generally to a camera module and a manufacturing method thereof.

BACKGROUND ART

Recently, super small camera modules have been developed, and the super small camera modules are widely used for small electronic products such as smart phones, notebooks, gamers and the like. Recently, super small cameras are mounted not only on electronic products but also on a front side of a vehicle for use of storing a travel state as an image or a video, or the super small cameras are mounted on a rear side of a vehicle to enable a user to quickly and easily park a vehicle.

The super small cameras mounted on a vehicle may include a lens, a lens barrel fixing the lens, a lens holder fixing the lens barrel and an image sensor module coupled to the lens holder. In general, the lens barrel and the lens holder, and the lens holder and the image sensor module are mutually assembled using an adhesive agent such as an epoxy resin.

When the lens barrel and the lens holder, and the lens holder and the image sensor module are assembled using an adhesive agent, an optical axis of the lens included in the lens barrel and an optical axis of image sensor included in the image sensor module are mutually aligned. This is because when the optical axis of lens and the optical axis of image sensor are inconsistent, an image obtained from the image sensor or an image quality can be greatly degraded.

However, when the alignment of optical axes are being progressed while the adhesive agent is hardened for bonding the lens barrel and the lens holder, and the lens holder and the image sensor module, the adhesive strength of adhesive agent may be decreased.

Furthermore, when an adhesive agent such as epoxy resin is used for bonding the lens barrel and the lens holder, and the lens holder and the image sensor module, an adhesive power of epoxy resin may be decreased because the epoxy resin is reacted with humidity to be hydrolyzed. Moreover, when an adhesive agent such as epoxy resin is used for bonding the lens barrel and the lens holder, and the lens holder and the image sensor module, each having a different thermal expansion coefficient, the adhesive characteristics of epoxy resin are greatly decreased due to thermal expansion and thermal shrinkage, thereby greatly reducing the reliability of camera module.

DETAILED DESCRIPTION OF THE INVENTION

Technical Subject

The present invention provides a camera module configured to achieve the prevention of quality deterioration and enhanced reliability of camera module by inhibiting from being hydrolyzed by humidity and by inhibiting a decreased coupling performance caused by thermal expansion and thermal shrinkage generated by rise and decline of temperature, and a manufacturing method thereof.

Technical Solution

In one general aspect of the present invention, there is provided a camera module comprising:
a lens barrel comprising a lens;
a lens holder for accommodating the lens barrel;
an image sensor disposed below the lens barrel;
a printed circuit board on which the image sensor is mounted and is coupled to the lens barrel; and
at least one welding point for mutually coupling the lens barrel and the lens holder while an optical axis of the lens and an optical axis of the image sensor are aligned.

Preferably, but not necessarily, the lens barrel may include a first welding part protruding from an outer circumferential surface of the lens barrel, and the lens holder may be protruded to face a distal end of the first welding part, and the welding point may weld the first and second welding parts.

Preferably, but not necessarily, the second welding part may be formed in a shape of a fence.

Preferably, but not necessarily, the lens barrel may include a first welding part protruding from an outer circumferential surface of the lens barrel, and the lens holder may include a plurality of second welding parts each intermittently protruded from an upper surface of lens holder, and the welding point may weld the first welding parts and second welding part.

Preferably, but not necessarily, a waterproof member may be formed along a space formed between an upper surface of lens holder and the first welding part.

Preferably, but not necessarily, the lens barrel may include a welding part extended from the outer circumferential surface of lens barrel to cover at least a portion of upper surface of lens holder, and the welding point may be formed between the upper surface and the welding part. Preferably, but not necessarily, the welding point may be formed using a laser beam.

Preferably, but not necessarily, the lens holder and the lens barrel welded by the welding point may be formed with the same material.

Preferably, but not necessarily, the lens barrel may include a first extension part extended from a lateral surface of lens barrel and a second extension part extended from the first extension part toward the lens holder, wherein the lens holder may include a protrusion so protruded as to face an inner lateral surface of the second extension part, and the welding point may be formed between the inner lateral surface of the second extension part and the protrusion.

In another general aspect of the present invention, there is provided a camera module, comprising:
a lens barrel comprising a lens;
a lens holder coupled to the lens barrel;
an image sensor disposed below the lens barrel;
a printed circuit board on which the image sensor is mounted and is coupled to the lens barrel; and
at least one welding point for mutually coupling the lens holder and the printed circuit board while an optical axis of the lens and an optical axis of the image sensor are aligned.

Preferably, but not necessarily, the welding point is formed by a laser beam, and the printed circuit board may include a metal plate made of the same material as that of lens holder in order to form the welding point by the laser beam, and the welding point may be formed between the lens holder and the metal plate.

In still another general aspect of the present invention, there is provided a manufacturing method of camera module, the method comprising:

temporarily assembling a camera module by arranging a lens barrel including a lens to a lens holder, and arranging a printed circuit board mounted with an image sensor to a bottom part of the lens holder;

aligning an optical axis of lens and an optical axis of the image sensor; and forming at least one welding point coupling the optical axis-aligned lens barrel and lens holder and coupling the optical axis-aligned lens holder and the printed circuit board respectively.

Preferably, but not necessarily, the welding point coupling the lens barrel to the lens holder may be formed by a laser beam provided to a direction facing a bottom part of the lens holder from an upper surface of the lens holder.

Preferably, but not necessarily, the welding point coupling the lens barrel to the lens holder may be formed by a laser beam provided to a direction facing the lens holder from a lateral direction of lens holder.

Preferably, but not necessarily, the method further comprising forming a waterproof member between the lens barrel and the lens holder in between the alignment step and the welding point forming step.

Preferably, but not necessarily, the welding point may be formed by using a laser beam.

Advantageous Effects

The camera module and manufacturing method thereof according to the present invention have an advantageous effect in that prevention of quality deterioration and enhanced reliability of camera module can be achieved by inhibiting from being hydrolyzed by humidity and by inhibiting a decreased coupling performance caused by thermal expansion and thermal shrinkage generated by rise and decline of temperature.

BRIEF DESCRIPTION OF DRAWINGS

FIG. 8 is a cross-sectional view illustrating a camera module according to still another exemplary embodiment of the present invention.

FIG. 9 is a flow chart illustrating a manufacturing method of camera module according to still another exemplary embodiment of the present invention.

BEST MODE

The invention described hereunder may be applied with various changes and several exemplary embodiments, and particular exemplary embodiments will be described in detail through exemplary drawings and detailed descriptions.

However, it should be noted that the present invention is not limited to particular exemplary embodiments, and it will be appreciated that the present invention described is intended to embrace all such alterations, modifications, and variations that fall within the scope and novel idea of the present invention. In describing the present invention, detailed descriptions of well-known art in the art may be omitted to avoid obscuring appreciation of the invention with unnecessary details.

The terminology used herein is for the purpose of describing particular exemplary embodiments only and is not intended to be limiting. As used herein, the singular forms may be intended to include the plural forms as well, unless the context clearly indicates otherwise.

The terms "including" or "comprising" are inclusive and therefore specify the presence of stated features, integers, steps, operations, elements, and/or components, but do not preclude the presence or addition of one or more other features, integers, steps, operations, elements, components, and/or groups thereof.

Although the terms, first, second, etc., may be used herein to distinguish various elements, these elements should not be limited by these terms. These terms may be only used to distinguish one element from another element.

"Welding point", a technical term frequently used herein, may be defined by an area where mutually opposite or contacted two elements are mutually welded. Furthermore, the "welding point", a technical term frequently used herein, may be formed by using separate welding members of low melting points, in addition to being formed by melting and welding mutually opposite or contacted two elements. Still furthermore, the "welding point", a technical term frequently used herein, may be formed in a shape of intermittently or continuously formed closed loop.

Figure 1:
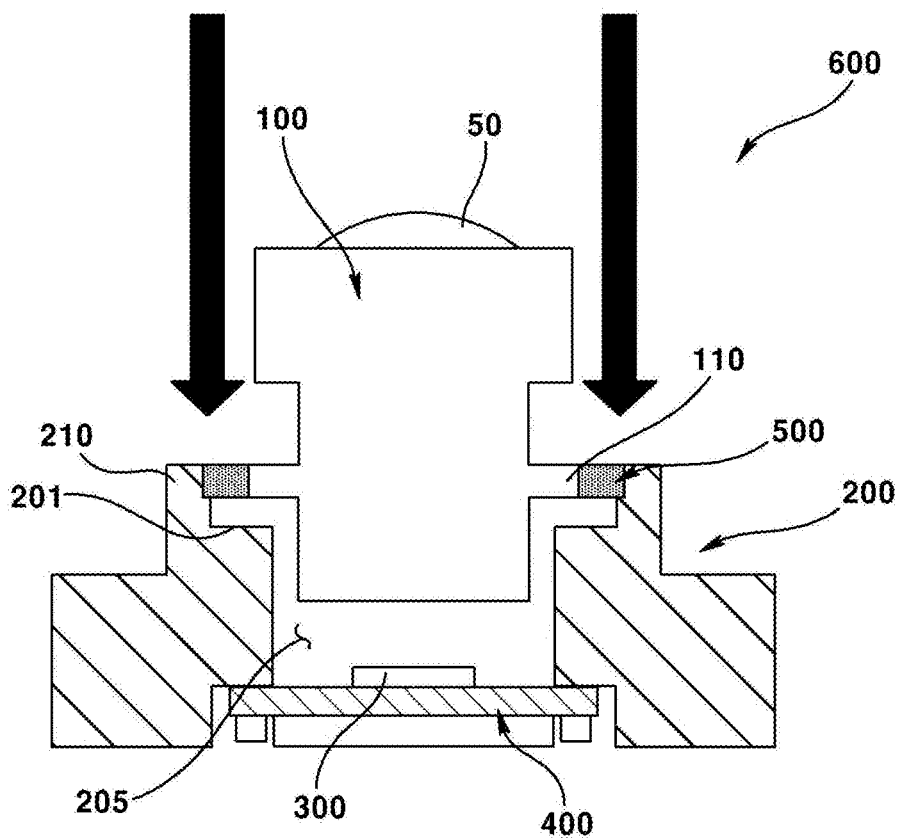
FIG. 1 is a cross-sectional view illustrating a camera module according to an exemplary embodiment of the present invention.
Figure 2:
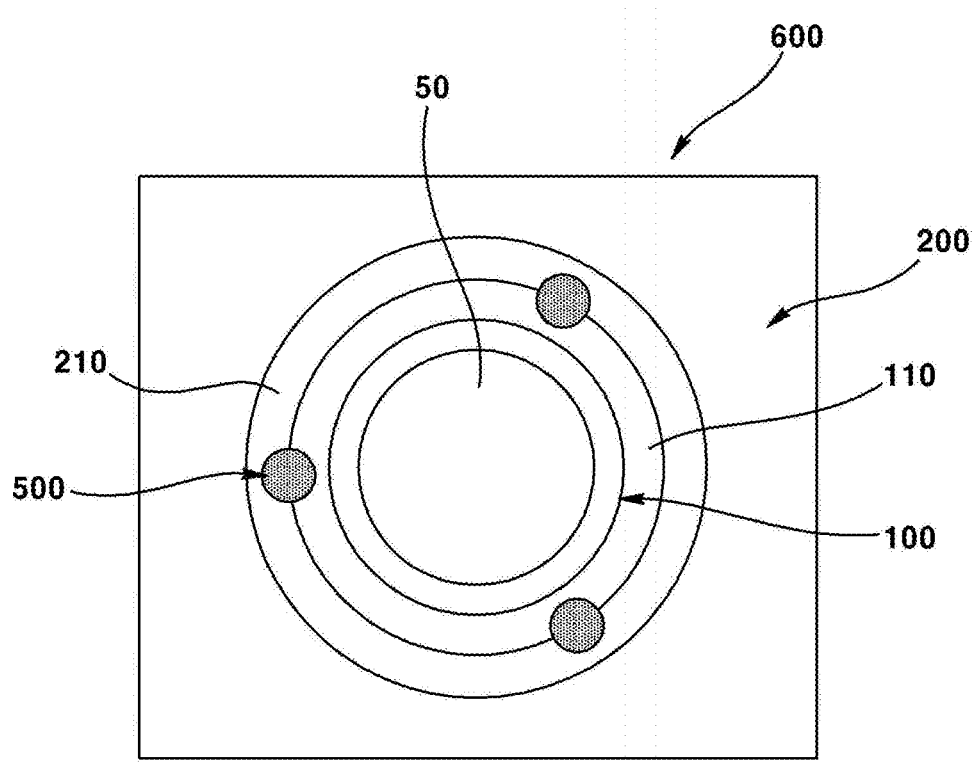
FIG. 2 is a plane view illustrating a welding point of FIG. 1.

FIG. 1 is a cross-sectional view illustrating a camera module according to an exemplary embodiment of the present invention, and FIG. 2 is a plane view illustrating a welding point of FIG. 1.

Referring to FIGS. 1 and 2, a camera module (600) may include a lens a lens barrel (100), a lens holder (200), an image sensor (300), a PCB (Printed Circuit Board, 400), and a welding point (500).

The lens barrel (100) may accommodate and fix a lens (50) functioning to provide an outside light to the image sensor (300). The lens barrel (100) may be accommodated and fixed with a lens (50), or a plurality of lenses (50). The lens in the exemplary embodiment of the present invention may be manufactured with a synthetic resin material, a glass material or a quartz material. The lens barrel (100) may be formed in a cylindrical shape in order to accommodate and fix the lens (50). The lens barrel (100) according to an exemplary embodiment of the present invention may be formed by processing a metal material in order to form a welding point (described later). Although the exemplary embodiment of the present invention has explained that the lens barrel (100) is formed by processing a metal material, the lens barrel (100) may be formed by processing synthetic resin material instead of metal material.

A first welding part (110) may be protruded or extended from a lateral surface of the lens barrel (100). The first welding part (110) may be formed to weld the lens holder (200, described later) and the lens barrel (100). The first welding part (110) in the exemplary embodiment of the present invention may be continuously protruded along a lateral surface of lens barrel (100), whereby the first welding part (110) may take a shape of a doughnut.

Although the exemplary embodiment of the present invention has explained that the first welding part (110) is protruded or extended from the lateral surface of lens barrel (100), the first welding part (110) may be intermittently protruded or extended from the lateral surface of lens barrel (100) in a plural number.

Although the first welding part (110) in the exemplary embodiment of the present invention may be integrally formed with the lens barrel (100), alternatively, the first welding part (110) may be manufactured separately from the lens barrel (100) and may be assembled or coupled with the lens barrel (100). The lens holder (200) may provide a space for accommodating the lens barrel (100) and the lens holder (200) may be coupled to the lens barrel (100). The lens holder (200) in the exemplary embodiment of the present invention may be manufactured with a same metal material as that of the lens barrel (100). Although it is explained that the lens holder (200) in the exemplary embodiment of the present invention is manufactured with the same metal material as that of the lens barrel (100), the lens holder (200) and the lens barrel (100) may be manufactured with a mutually different metal material. The lens holder (200) may accommodate the lens barrel (100) and may be coupled with the lens barrel (100), the lens holder (200) may be also coupled with a PCB (Printed Circuit Board, described later).

The lens holder (200) may be formed with a hollow hole (205) into which the lens barrel (100) including the lens (50) may be inserted. A second welding part (210) may be protruded or extended from an upper surface (201) of lens holder (200) to a direction facing the first welding part (110) of lens barrel (100). The second welding part (210) in the exemplary embodiment of the present invention may be protruded or extended from the upper surface (201) of the lens holder (200) in a shape of a fence.

An inner lateral surface of the second welding part (210) formed on the upper surface (201) of lens holder (200) may face a distal end of the first welding part (110) of the lens barrel (100), whereby a predetermined size of gap may be formed between the inner lateral surface of second welding part (210) and the first welding part (110).

The image sensor (300) may be arranged on an optical path of a light having passed the lens (50) of the lens barrel (100) and may be mounted on a PCB (400). The PCB (400) mounted with the image sensor (300) may be coupled to a bottom part facing the upper surface (201) of the lens holder (200). The PCB (400) in the exemplary embodiment of the present invention may be coupled to the lens holder (200) using a fastening screw and the like.

An optical axis of the image sensor (300) mounted on the PCB (400) and an optical axis of lens (50) coupled to the lens barrel (100) must be mutually and accurately aligned in the exemplary embodiment of the present invention. When the optical axis of the image sensor (300) and the optical axis of lens (50) are not aligned, an image obtained from the image sensor (300) may be greatly degraded or the image quality may be greatly deteriorated.

Thus, in the exemplary embodiment of the present invention, an optical axis of image sensor (300) coupled to the lens holder (200) and an optical axis of lens barrel (100) fixed by the lens (50) are mutually aligned before the lens barrel (100) and the lens holder (200) are mutually welded using a welding point (500, described later).

When the lens barrel (100) is aligned relative to the lens holder (200) to allow the optical axis of lens (50) and the optical axis of image sensor (300) are aligned, the lens barrel (100) assembled to the lens holder (200) may be welded to the lens holder (200) using a welding process.

Referring to FIGS. 1 and 2, the welding point (500) according to an exemplary embodiment of the present invention may mutually weld the first welding part (110) of lens barrel (100) and the second welding part (210) of lens holder (200). The welding point (500) may be formed by a high energy laser bean, for example. Although the exemplary embodiment of the present invention has illustrated and explained that the welding point (500) mutually welds the first welding part (110) of lens barrel (100) and the second welding part (210) of lens holder (200), the first and second welding parts (110, 210) may be welded by various welding methods.

As the high energy laser beam is provided to the lens barrel (100) formed with a metal material and the lens holder (200) formed with a metal material, an area where the welding point (500) is formed in the lens barrel (100) and the lens holder (200) is melted, whereby the first and second welding parts (110,210) can be mutually welded.

When the first and second welding parts (110, 210) are welded using a high energy laser beam in the exemplary embodiment of the present invention, the high energy laser beam may be provided to a direction facing a border between the first and second welding parts (110, 210) at an upper surface of lens holder (300).

The welding point (500) mutually welding the first and second welding parts (110, 210) may be formed at one to four areas at the border of the first and second welding parts (110,120), and the welding points (500) may be mutually formed at an equidistance or at an equidistant angle. Alternatively, the welding points (500) may be formed at four areas or more areas, or the welding points (500) may be formed at a mutually different distance or a mutually different angle.

When the welding points (500) are formed at the first and second welding parts (110,120) after an optical axis of lens (50) included in the lens barrel (100) is aligned on an optical axis of image sensor (300) according to the exemplary embodiment of the present invention, the binding force (coherence, coupling force) between the first and second welding parts (110,120) can be inhibited even if moisture is provided from outside, or the thermal expansion coefficient between the first and second welding parts (110,120) is different, whereby reliability of camera module can be enhanced to thereby prevent inhibit degradation of performance of camera module.

Figure 3:
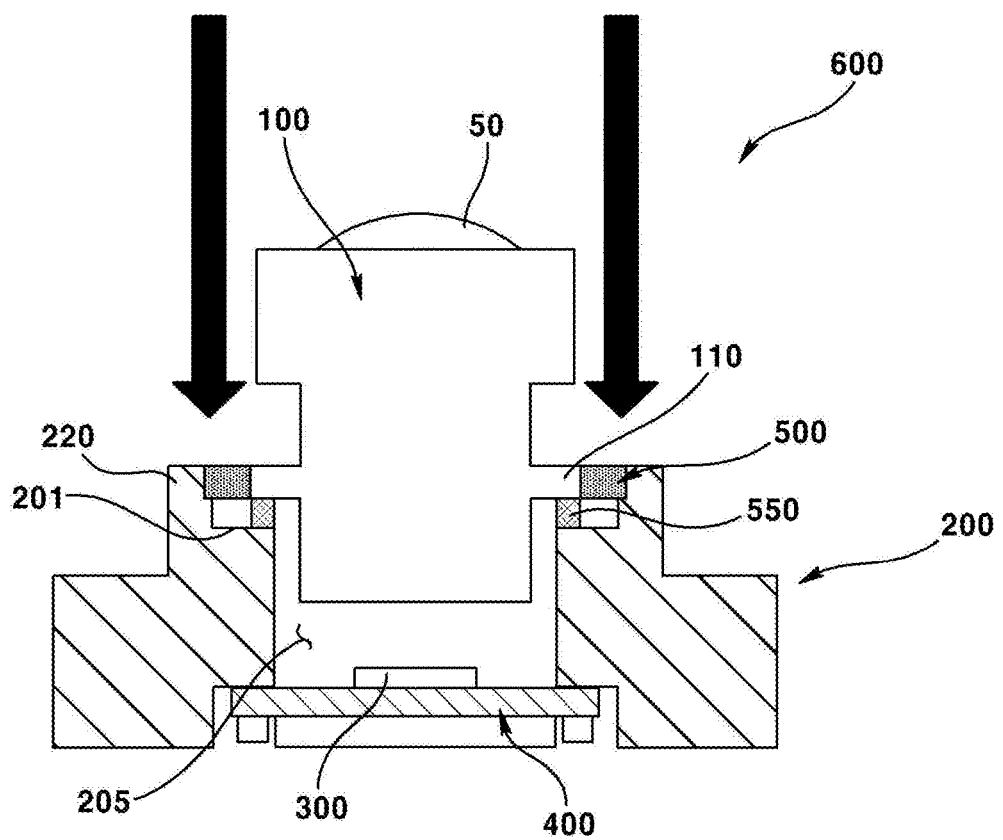
FIG. 3 is a cross-sectional view illustrating a camera module according to another exemplary embodiment of the present invention.
Figure 4:
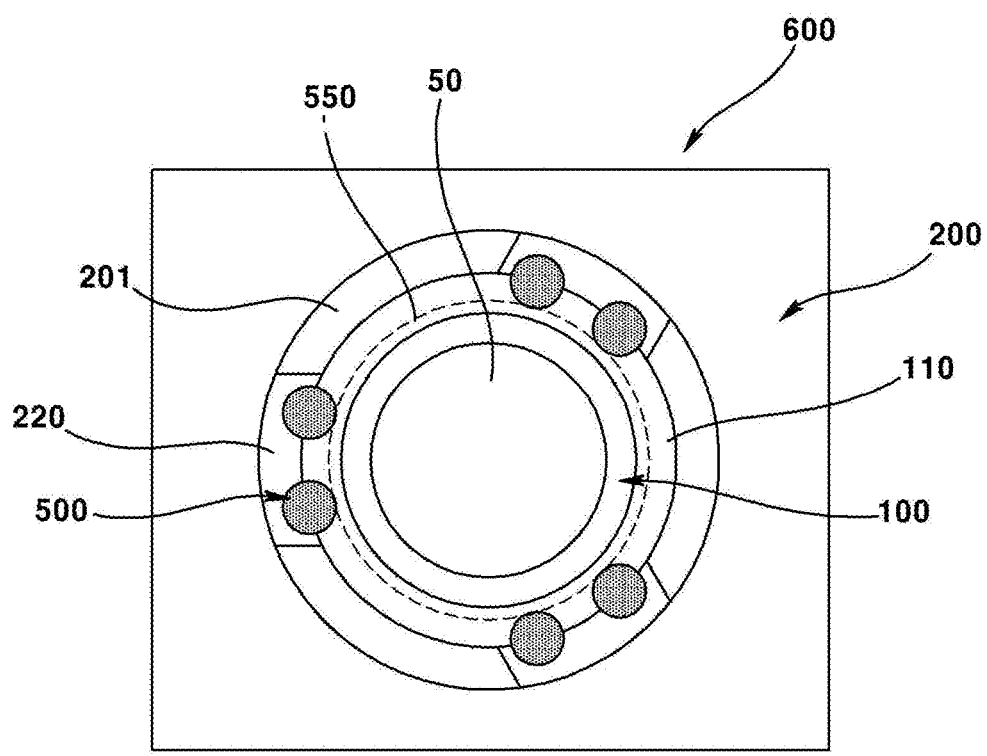
FIG. 4 is a plane view illustrating a welding point of FIG. 3.

FIG. 3 is a cross-sectional view illustrating a camera module according to another exemplary embodiment of the present invention, and FIG. 4 is a plane view illustrating a welding point of FIG. 3.

The camera module illustrated in FIGS. 3 and 4 according to the exemplary embodiment of the present invention is substantially same as that illustrated in FIGS. 1 and 2 in terms of configuration except for the second welding part and waterproof member of lens holder, such that any redundant explanation for the same configurations will be omitted and same configurations will be provided with same names and same reference numerals as those in the FIGS. 1 and 2.

Referring to FIGS. 3 and 4, a camera module (600) may include a lens barrel (100), a lens holder (200), an image sensor (300), a PCB (400), a welding point (500) and a waterproof member (550).

The lens barrel (100) may be formed at an outer circumferential surface with a first welding part (110), where the first welding part (110) may be formed in a shape of a doughnut. The lens holder (200) may include a second welding part (220) protruded or extended from an upper surface (201) of lens holder (200). The second welding part (220) of lens holder (200) may be intermittently protruded or intermittently extended from the upper surface (201) of lens holder (200), as illustrated in FIG. 4.

The second welding part (220) in the exemplary embodiment of the present invention may be formed at three (3) or four (4) areas, each at equidistance from the upper surface (201) of lens holder (200). Alternatively, the second welding part (220) may be formed at four or more areas from the upper surface (201) of lens holder (200), and the second welding parts (220) may be formed at a mutually different distance or at a mutually different angle.

An inner lateral surface of second welding part (220) formed at the lens holder (200) may be so disposed as to face a distal end of first welding part (110) formed at the lens barrel (100), and a predetermined gap may be formed between the first and second welding parts (110,220).

The welding point (500) may weld the first and second welding parts (110, 220) to mutually weld the lens barrel (100) and the lens holder (200) while an optical axis of image sensor (300) and an optical axis of lens (500) are aligned. The welding point (500) may be formed at a border between the first and second welding parts (110,220) by a high energy laser beam.

A waterproof member (550) may be interposed between a bottom surface of first welding part (110) and an upper surface (201) of lens holder (200) to inhibit the outside moisture, outside water or dust from being introduced into an image sensor (300) disposed at an inside of the lens holder (200). The waterproof member (550) may be formed in a closed loop shape along the upper surface (201) of the lens holder (200). The waterproof member (550) may be formed by hardening (curing) a flexible epoxy resin, where the epoxy resin contained in the waterproof member (550) may be a photosensitive material that is curable by light, a thermosetting material that is curable by heat, and a hybrid hardening material that is curable by heat or light.

Figure 5:
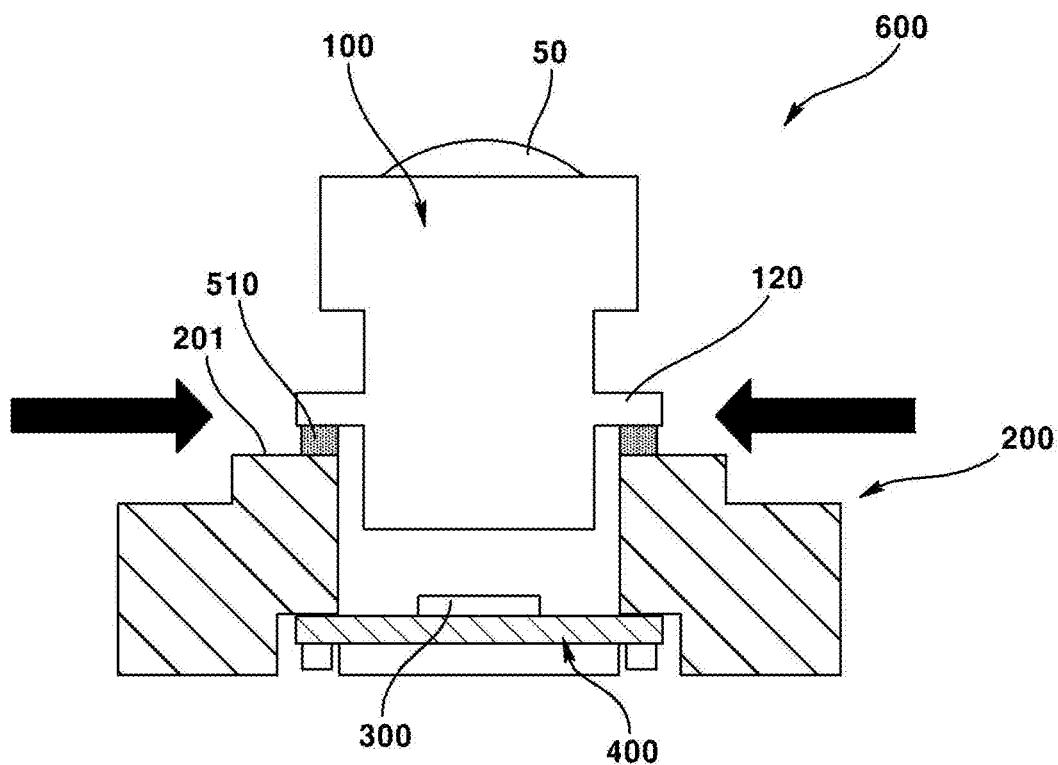
FIG. 5 is a cross-sectional view illustrating a camera module according to still another exemplary embodiment of the present invention.
Figure 6:
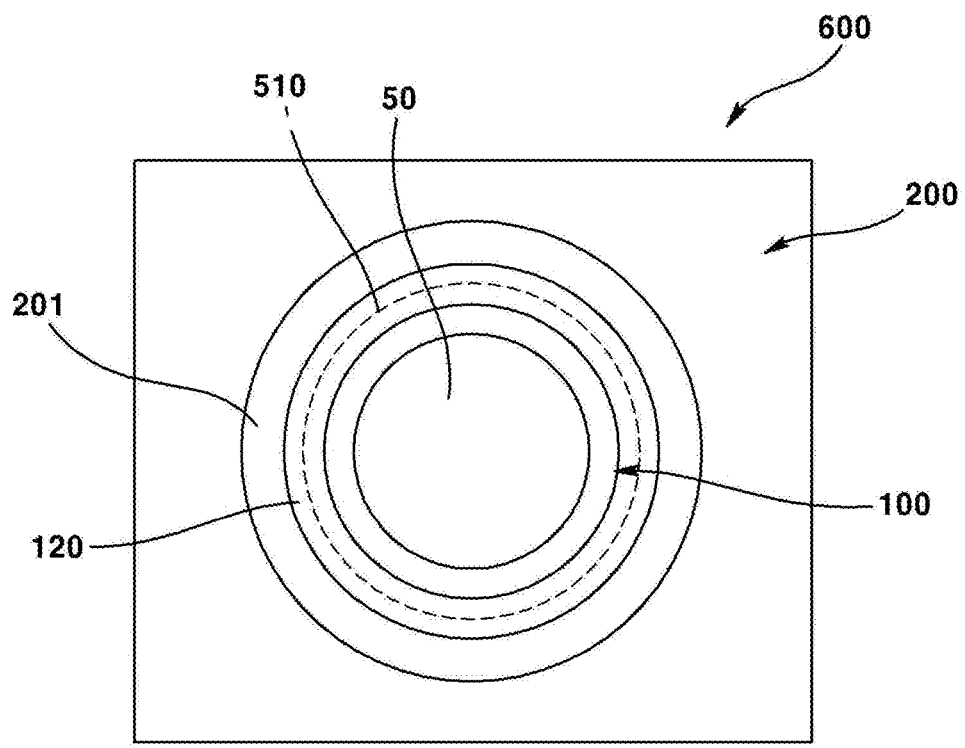
FIG. 6 is a plane view of FIG. 5.

FIG. 5 is a cross-sectional view illustrating a camera module according to still another exemplary embodiment of the present invention, and FIG. 6 is a plane view of FIG. 5.

The camera module illustrated in FIGS. 5 and 6 according to the exemplary embodiment of the present invention is substantially same as that illustrated in FIGS. 1 and 2 in terms of configuration except for an image sensor of camera module and a PCB, such that any redundant explanation for the same configurations will be omitted and same configurations will be provided with same names and same reference numerals as those in the FIGS. 1 and 2.

Referring to FIGS. 5 and 6, a camera module (600) may include a lens barrel (100), a lens holder (200), an image sensor (300), a PCB (400) and a welding point (510).

The lens barrel (100) according to an exemplary embodiment of the present invention may include a welding part (120) protruded or extended from a lateral surface of lens barrel (100). The welding part (120) may be protruded or extended from the lateral surface of lens barrel (100) in order to cover at least a portion of an upper surface (201) of lens holder (200). The welding part (120) may be extended from a lateral surface of lens barrel (100) in the shape of a doughnut, for example. The welding part (120) formed at the lens barrel (100) may cover at least a portion of upper surface (201) of lens holder (200), and the lens barrel (100) may be spaced apart at a predetermined distance from the upper surface (201) of lens holder (200) in order to align an optical axis relative to the image sensor (300). The welding part (120) may be formed between a bottom surface of welding part (120) protruded or extended from the lateral surface of lens barrel (100) and the upper surface (201) of lens holder (200) that faces the bottom surface of the welding part (120).

The welding point (510) may be formed by a high energy laser beam, and the welding point (510) can fix an optical axis-aligned lens barrel (100) relative to the image sensor (300) by welding the lens barrel (100) to the lens holder (200) by melting the welding part (120) formed at the lens barrel (100) and a portion of the upper surface (210) of the lens holder. The welding point (510) is formed between welding part (120) and the upper surface (201) of lens holder (200), such that the high energy laser beam forming the welding point (510) may be provided from a lateral surface of lens holder (200) to a horizontal direction, for example.

Figure 7:
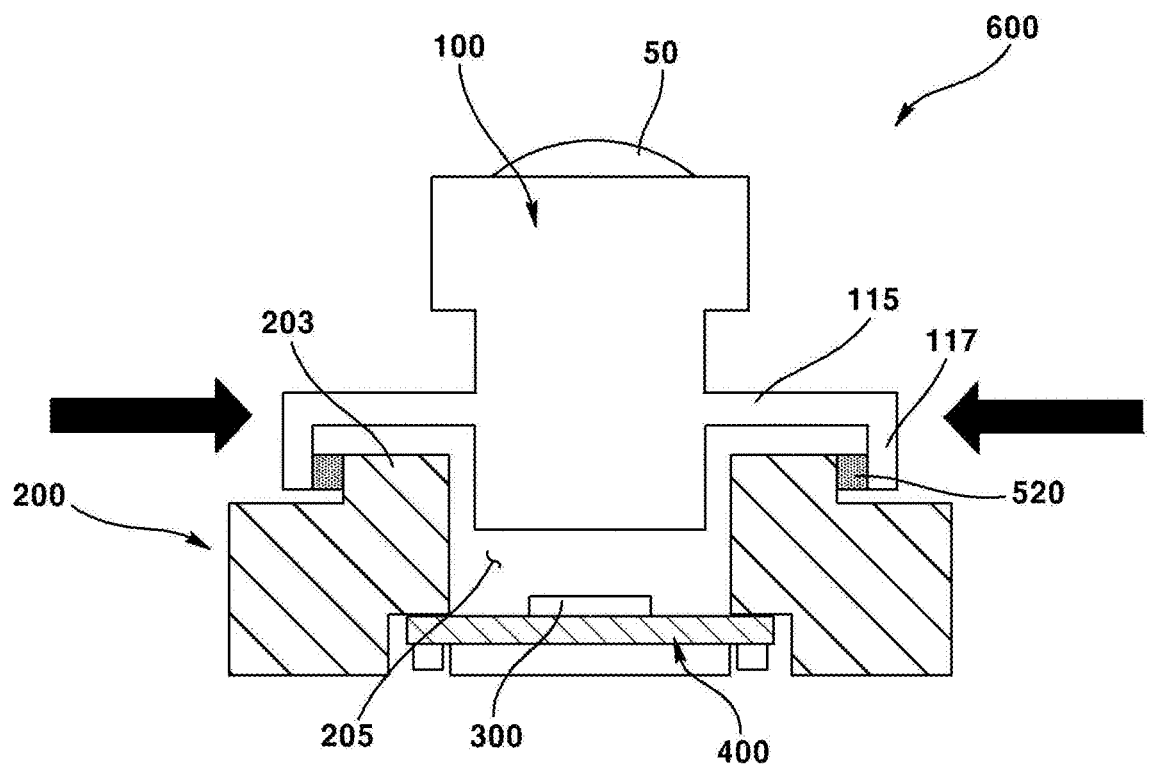
FIG. 7 is a cross-sectional view illustrating a camera module according to still another exemplary embodiment of the present invention.

FIG. 7 is a cross-sectional view illustrating a camera module according to still another exemplary embodiment of the present invention.

An image sensor and a PCB of camera module illustrated in FIG. 7 according to the exemplary embodiment of the present invention is substantially same as those illustrated in FIGS. 1 and 2 in terms of configuration, such that any redundant explanation for the same configurations will be omitted and same configurations will be provided with same names and same reference numerals as those in the FIGS. 1 and 2.

Referring to FIG. 7, a camera module (600) may include a lens barrel (100), a lens holder (200), an image sensor (300), a PCB (400) and a welding point (520).

The lens barrel (100) according to an exemplary embodiment of the present invention may include a first extension part (115) protruded or extended from a lateral surface of lens barrel (100), and a second extension part (117) bent toward the lens holder (200) from the first extension part (115).

The first extension part (115) may be extended along a lateral surface of the lens barrel (110) in a plate shape, and the first extension part (115) may be extended from the lateral surface of lens barrel (110) in a disc shape, for example.

The second extension part (117) may be extended from a distal end of the first extension part (115) toward a protrusion (203) extended from an upper surface of lens holder (200).

The second extension part (117) according to an exemplary embodiment of the present invention may be extended from the first extension part (115) in a skirt shape, and the second extension part (117) may have a cylindrical shape, for example. An inner lateral surface of second extension part (117) may be in contact with a lateral surface of the protrusion (203) protruded from an upper surface of lens holder (200). Alternatively, the inner lateral surface of second extension part (117) and the protrusion (203) of lens holder (200) may be mutually spaced apart from each other at a predetermined distance.

At least one welding point (520) may be formed between the inner lateral surface of second extension part (117) and a lateral surface of protrusion (203) while the second extension part (117) and the protrusion (203) are mutually in contacted. The welding point (520) may be formed by a high energy laser beam, and the welding point (520) may be formed between an inner lateral surface of second extension part (117) and a lateral surface of protrusion (203) in one or a plural number, each at a predetermined distance. Alternatively, the welding point (520) may be continuously formed along between the inner lateral surface of second extension part (117) and a lateral surface of protrusion (203) to thereby inhibit moisture or foreign objects from being introduced into an inner space of lens holder (200).

When the first and second extension parts (114, 117) are formed at the lens barrel (100) and the protrusion (203) formed at the second extension part (117) and the lens holder (200), and when the welding point (520) is formed using the protrusion (203) formed at the second extension part (117) and the lens holder (200), the number of assembly processes can be reduced without recourse to use of a separate waterproof member using a waterproof member such as epoxy resin.

FIG. 8 is a cross-sectional view illustrating a camera module according to still another exemplary embodiment of the present invention.

Referring to FIG. 8, a camera module (700) may include a lens barrel (710), a lens holder (720), an image sensor (730), a PCB (740) and a welding point (750).

The lens barrel (710) may accommodate a lens (715) therein, and an outer circumferential surface of lens barrel (710) may be formed with a male screw part (712). An inner lateral surface of lens holder (720) may be formed with a hollow hole formed with a female screw part (721), and the female screw part (721) of the lens holder (720) may be fastened by the male screw part (712) of lens barrel (710).

A bottom surface (723) of lens holder (720) may be formed with a PCB (740), and the PCB (740) may be mounted with an image sensor (730). An optical axis of image sensor (730) mounted at the PCB (740) may be aligned with an optical axis of lens (715) while the lens barrel (710) according to an exemplary embodiment of the present invention is screw-fastened to the lens holder (720).

The PCB (740) mounted with the image sensor (730) may be coupled to a bottom surface (723) of lens holder (740) while an optical axis of image sensor (730) and an optical axis of lens (715) are aligned. The bottom surface (723) of lens holder (720) and the PCB (740) in the exemplary embodiment of the present invention may be welded by a high energy laser beam, whereby a welding point (750) may be formed between the bottom surface (723) of lens holder (720) and the PCB (740).

The welding point (750) in the exemplary embodiment of present invention may be formed at three (3) to four (4) areas, for example, and each welding point (750) may be formed at equidistant gap. Meantime, when the lens holder (720) and the PCB (740) are mutually welded using the high energy laser beam, and when the lens holder (720) is manufactured with a metal material, there may be generated a welding defect because the PCB (740) may be first melted before the lens holder (720) is melted by the laser beam.

In order to inhibit the abovementioned welding defect from being generated, a metal plate (745) including a metal material may be formed at an area where the welding point (750) is to be formed to allow the lens holder (720) and the metal plate (745) to be simultaneously melted and welded, when the lens holder (720) and the PCB (740) are welded according to the present exemplary embodiment of the present invention.

FIG. 9 is a flow chart illustrating a manufacturing method of camera module according to still another exemplary embodiment of the present invention.

Referring to FIGS. 1 and 9, in order to manufacture a camera module (600), a lens barrel (100) including a lens (50) is first arranged on a lens holder (200) accommodating the lens barrel (100), and a camera module (600) arranging a PCB (400) mounted with an image sensor (300) is temporarily assembled (initial assembly) on a bottom surface of lens holder (200) (Step S10). When an initial assembly of camera module (600) is implemented, an optical axis of lens (50) and an optical axis of image sensor (300) are aligned using an optical axis alignment device (Step S20).

When the optical axis of lens of the lens barrel (100) and the optical axis of image sensor (300) are aligned, a step is performed to form at least one welding point (500) by coupling the optical axis-aligned lens barrel (100) and lens holder (200), or by coupling the optical axis-aligned lens holder (200) and the PCB (400), respectively (Step S30).

In the step of forming the welding point (510), as illustrated in FIG. 1, a first welding part (110) formed on the lens barrel (100) and a second welding part (210) formed on the lens holder (200) are welded using a laser beam.

At this time, a border between the first and second welding parts (110,210) is exposed to an upper surface, such that the laser beam is provided to a direction facing the border from an upper surface of lens holder (200).

In the step of forming the welding point (500), as illustrated in FIG. 8, the optical axis of lens (715) and an optical axis of image sensor (730) are aligned, and the PCB (740) and the lens holder (720) can be welded using the laser beam.

Meantime, in the exemplary embodiment of the present invention, as illustrated in FIG. 3, a waterproof member (550) may be formed between the first welding part (110) of lens barrel (100) and the second welding part (210) of lens holder (200) in between the Step (S20) of aligning the optical axis of lens (50) and the optical axis of image sensor (300) and the Step (S30) of forming the welding point.

As discussed from the foregoing explanation, the camera module and manufacturing method thereof according to the present invention have an advantageous effect in that prevention of quality deterioration and enhanced reliability of camera module can be achieved by inhibiting from being hydrolyzed by humidity and by inhibiting a decreased coupling performance caused by thermal expansion and thermal shrinkage generated by rise and decline of temperature.

Meantime, the exemplary embodiments disclosed by the enclosed drawings are merely particular examples in order to help understand the present invention, and may not be considered as limiting the scope of the present invention. It should be apparent to the skilled in the art that other modifications based on the technical ideas of the present invention are implementable.

INDUSTRIAL APPLICABILITY

The present invention may be used for a camera module mounted on a vehicle and the like.

The invention claimed is:
1. A camera module comprising:
a lens barrel comprising a lens;
a lens holder coupled with the lens barrel;
a printed circuit board fixed to the lens holder;
an image sensor disposed on the printed circuit board and disposed below the lens barrel; and a welding point coupling the lens barrel and the lens holder while an optical axis of the lens and an optical axis of the image sensor are aligned, wherein the lens barrel comprises an outer lateral surface facing an inner lateral surface of the lens holder, a first extension part extending from the outer lateral surface of the lens barrel, and a second extension part extending downwardly from the first extension part, wherein the first and second extension parts are overlapped with the lens holder in a direction of the optical axis of the lens, wherein the welding point fixes the second extension part of the lens barrel to the lens holder so that the outer lateral surface of the lens barrel is spaced apart from the inner lateral surface of the lens holder, and wherein the second extension part is disposed above an upper surface of the lens holder.

2. The camera module of claim 1, wherein the lens holder comprises a protrusion protruding upwardly from the upper surface of the lens holder.

3. The camera module of claim 2, wherein an inner lateral surface of the second extension part faces an outer lateral surface of the protrusion.

4. The camera module of claim 3, wherein the welding point is disposed between the inner lateral surface of the second extension part and the outer lateral surface of the protrusion.

5. The camera module of claim 2, wherein the protrusion of the lens holder is formed in the shape of a fence.

6. The camera module of claim 1, comprising a waterproof member disposed between the lens barrel and the lens holder.

7. The camera module of claim 1, wherein the welding point is disposed above the upper surface of the lens holder.

8. The camera module of claim 1, wherein the lens holder and the lens barrel welded by the welding point are formed with the same material.

9. The camera module of claim 1, wherein the first extension part overlaps with the upper surface of the lens holder, and wherein the welding point is disposed between the first extension part and the upper surface of the lens holder.

10. The camera module of claim 1, wherein the first extension part is disposed above the upper surface of the protrusion.

11. The camera module of claim 1, wherein the welding point is formed by a laser beam, and wherein the laser beam is inwardly provided from an outer side of at least one of the lens holder and the lens barrel.

12. The camera module of claim 1, wherein the outer lateral surface of the lens barrel is not directly coupled with the inner lateral surface of the lens holder.

13. The camera module of claim 1, wherein a gap is formed between the outer lateral surface of the lens barrel and the inner lateral surface of the lens holder, and wherein the gap extends from the upper surface of the lens holder to a lower end of the lens barrel.

14. A camera module comprising:
a lens barrel comprising a lens;
a lens holder coupled with the lens barrel;
a printed circuit board fixed to the lens holder;
an image sensor disposed on the printed circuit board and below the lens barrel; and
a welding point coupling the lens barrel and the lens holder while an optical axis of the lens and an optical axis of the image sensor are aligned, wherein the lens barrel comprises a first extension part extending from a lateral surface of the lens barrel, and a second extension part extending downwardly from the first extension part, wherein the lens holder comprises a protrusion protruding upwardly from an upper surface of the lens holder, wherein the second extension part is disposed above the upper surface of the lens holder, and wherein an inner lateral surface of the second extension part faces an outer lateral surface of the protrusion.

15. The camera module of claim 14, wherein the welding point is disposed between the inner lateral surface of the second extension part and the outer lateral surface of the protrusion.

16. The camera module of claim 15, wherein the welding point is disposed above the upper surface of the lens holder.

17. The camera module of claim 14, wherein the first extension part is disposed above the upper surface of the protrusion.

18. The camera module of claim 17, wherein the welding point is exposed to an outward direction.

* * * * *